US012719287B2

(12) United States Patent
Nagesh et al.

(10) Patent No.: US 12,719,287 B2
(45) Date of Patent: Aug. 25, 2026

(54) SYSTEMS AND METHODS OF MODE SELECTION IN MICROGRIDS

(71) Applicant: Caterpillar Inc., Peoria, IL (US)

(72) Inventors: Sowmya Nagesh, Peoria, IL (US); Ronald Christopher Gayles, Peoria, IL (US); Gregory Scott Hasler, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 157 days.

(21) Appl. No.: 18/609,142

(22) Filed: Mar. 19, 2024

(65) Prior Publication Data

US 2025/0300466 A1 Sep. 25, 2025

(51) Int. Cl.
*H02J 3/46* (2026.01)
*H02J 3/007* (2026.01)
(Continued)

(52) U.S. Cl.
CPC .............. *H02J 3/46* (2013.01); *H02J 3/0073* (2020.01); *H02J 3/0075* (2020.01); *H02J 3/388* (2020.01);
(Continued)

(58) Field of Classification Search
CPC .......... H02J 3/46; H02J 3/0073; H02J 3/0075; H02J 3/388; H02J 2203/10; H02J 2300/24;
(Continued)

(56) References Cited

U.S. PATENT DOCUMENTS 9,683,503 B2 6/2017 Zhang et al.
10,530,163 B2 1/2020 Rodriguez et al.
(Continued)

FOREIGN PATENT DOCUMENTS

CN 108270242 A 7/2018
CN 111509845 A 8/2020
(Continued)

OTHER PUBLICATIONS

Gurung Niroj et al: Demonstration of Islanding and Grid Reconnection capability of a microgrid within distribution system?, 2022 IEEE PES Innovation Smart Grid Technologies—Asia (ISGT Asia), IEEE, Nov. 1, 2022 (Nov. 1, 2022), pp. 655-659, XP034269127, DOI: 10.1109/ISGTASIA54193.2022.10003608n (retrieved on Jan. 11, 2023), p. 655-658.

(Continued)

*Primary Examiner* — Richard Tan
(74) *Attorney, Agent, or Firm* — Foley & Lardner LLP

(57) ABSTRACT

Systems and methods for operating a microgrid may include a plurality of microgrid power supply assets of a microgrid, where microgrid power supply assets include a first microgrid power supply asset of a first type and a second microgrid power supply asset different from the first type, and a microgrid controller communicably coupled to the plurality of microgrid power supply assets, and configured to control supply of power from one or more of the plurality of microgrid power supply assets to one or more loads of the microgrid. The microgrid controller may receive, via a human machine interface (HMI), a sequence of operations in which to control power supply to the microgrid; determine an operating mode in which to supply power to the load(s), according to the sequence of operations; and control one or more interfaces according to the operating mode, to control the supply of power to the load(s).

20 Claims, 10 Drawing Sheets

(51) Int. Cl.

| | |
|---|---|
| ***H02J 3/0073*** | (2026.01) |
| ***H02J 3/388*** | (2026.01) |
| *H02J 101/24* | (2026.01) |
| *H02J 103/35* | (2026.01) |

(52) U.S. Cl.
CPC ....... *H02J 2101/24* (2026.01); *H02J 2103/35* (2026.01)

(58) Field of Classification Search
CPC ............... H02J 2300/10; H02J 2300/20; H02J 13/00001; H02J 3/06; H02J 2310/10
USPC ............................................................ 307/25
See application file for complete search history.

(56) References Cited

U.S. PATENT DOCUMENTS

| | | | | |
|---|---|---|---|---|
| 2012/0245869 | A1* | 9/2012 | Ansari | G01R 11/24 702/62 |
| 2013/0046415 | A1 | 2/2013 | Curtis | |
| 2016/0226252 | A1* | 8/2016 | Kravtiz | H02M 7/537 |
| 2023/0120740 | A1 | 4/2023 | Lewchuk et al. | |

FOREIGN PATENT DOCUMENTS

| | | | |
|---|---|---|---|
| CN | 115689004 | A | 2/2023 |
| CN | 111293719 | B | 6/2023 |
| EP | 2869423 | A1 | 5/2015 |
| WO | WO-2015/063159 | A2 | 5/2015 |

OTHER PUBLICATIONS

James Gula: "A Generic Microgrid Controller", IEEE Draft WGDS; 859477929427, IEEE-SA Imeet Central, Piscataway, NJ USA, vol. 2030.1, Jun. 6, 2019 (Jun. 6, 2019), pp. 1-43, XP068245304, retrieved from the internet: URL:https://ieee-sa.imeetcentral.com/p/aQAAAAAD3rsk, retrieved on Jul. 20, 2023] p. 1-p. 41.

Reischboeck Markus et al: "Functional Overview of Microgrid Control Applications", 2021 6th IEEE Workshop on the Electronic Grid (EGRID), IEEE, Nov. 8, 2021 (Nov. 8, 2021), pp. 1-6 XP033997186, DOI: 10.1109/EGRID527932021.9662146 [retrieved on Dec. 22, 2021] p. 3-p. 6.

Written Opinion and International Search Report for Int'l. Patent Appln. No. PCT/US2025/016213, mailed May 19, 2025 (15 pgs).

* cited by examiner

SYSTEMS AND METHODS OF MODE SELECTION IN MICROGRIDS

TECHNICAL FIELD

The present disclosure relates generally to the field of microgrids, including but not limited to systems and methods of efficiency mode selection in grid connected microgrids.

BACKGROUND

Various locations, buildings, worksites, and other locations may require power for operations. For example, at a construction site, power may be supplied to the construction site for operating equipment, lighting, and other applications or loads. Some locations may implement a microgrid, which can include various power sources which deliver or otherwise supply power to the microgrid for delivery to loads. Such power sources can include, for example, generator sets (gensets), battery storage devices, renewable energy sources, and/or utility lines. Such microgrids may be controlled by a microgrid controller.

For example, P.C.T. Publication No. WO2015/063159 describes a method and apparatus for controlling power distribution within a microgrid (1). The microgrid comprises a power source module, a power storage module, and a load module. The power storage module may operate as a further power source and a power store. The load module may receive power from the power source module and the power storage module. The method described includes: providing predefined modes of operation for the microgrid, each mode specifying an operational mode for one or more of the microgrid modules; receiving one or more signals, each signal specifying operational parameters of the microgrid modules; using the received signals, selecting a mode of operation for the microgrid; and controlling the microgrid modules such that they operate as specified in the selected mode of operation.

SUMMARY

A first aspect provided herein relates to a system. The system includes a plurality of microgrid power supply assets of a microgrid, the plurality of microgrid power supply assets comprising a first microgrid power supply asset of a first type and a second microgrid power supply asset different from the first type. The system includes a microgrid controller communicably coupled to the plurality of microgrid power supply assets, and configured to control supply of power from one or more of the plurality of microgrid power supply assets to one or more loads of the microgrid. The microgrid controller includes one or more processors and memory storing instructions that, when executed, cause the microgrid controller to: receive, via a human machine interface (HMI), a sequence of operations in which to control power supply to the microgrid, determine an operating mode in which to supply power to the one or more loads, from a plurality of operating modes, according to the sequence of operations, and control one or more interfaces according to the operating mode, to control the supply of power to the one or more loads.

A second aspect provided herein relates to a method. The method includes receiving, by a microgrid controller via a human machine interface (HMI), a sequence of operations in which to control power supply to a microgrid by a plurality of microgrid power supply assets of the microgrid, the plurality of microgrid power supply assets comprising a first microgrid power supply asset of a first type and a second microgrid power supply asset different from the first type. The method includes determining, by the microgrid controller, an operating mode in which to supply power to one or more loads of the microgrid, from a plurality of operating modes, according to the sequence of operations. The method includes controlling, by the microgrid controller, one or more interfaces according to the operating mode, to control the supply of power to the one or more loads.

A third aspect provided herein relates to a microgrid controller. The microgrid controller includes a communications interface communicably coupled to a plurality of microgrid power supply assets, the plurality of microgrid power supply assets comprising a first microgrid power supply asset of a first type and a second microgrid power supply asset different from the first type. The microgrid controller includes a human-machine interface configured to receive a sequence of operations in which to control power supply to the microgrid. In some embodiments, the microgrid controller further includes a processing circuit comprising one or more processors and memory storing instructions that, when executed, cause the processing circuit to determine an operating mode in which to supply power to one or more loads of the microgrid, from a plurality of operating modes, according to the sequence of operations, and control one or more interfaces according to the operating mode, to control the supply of power to the one or more loads

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
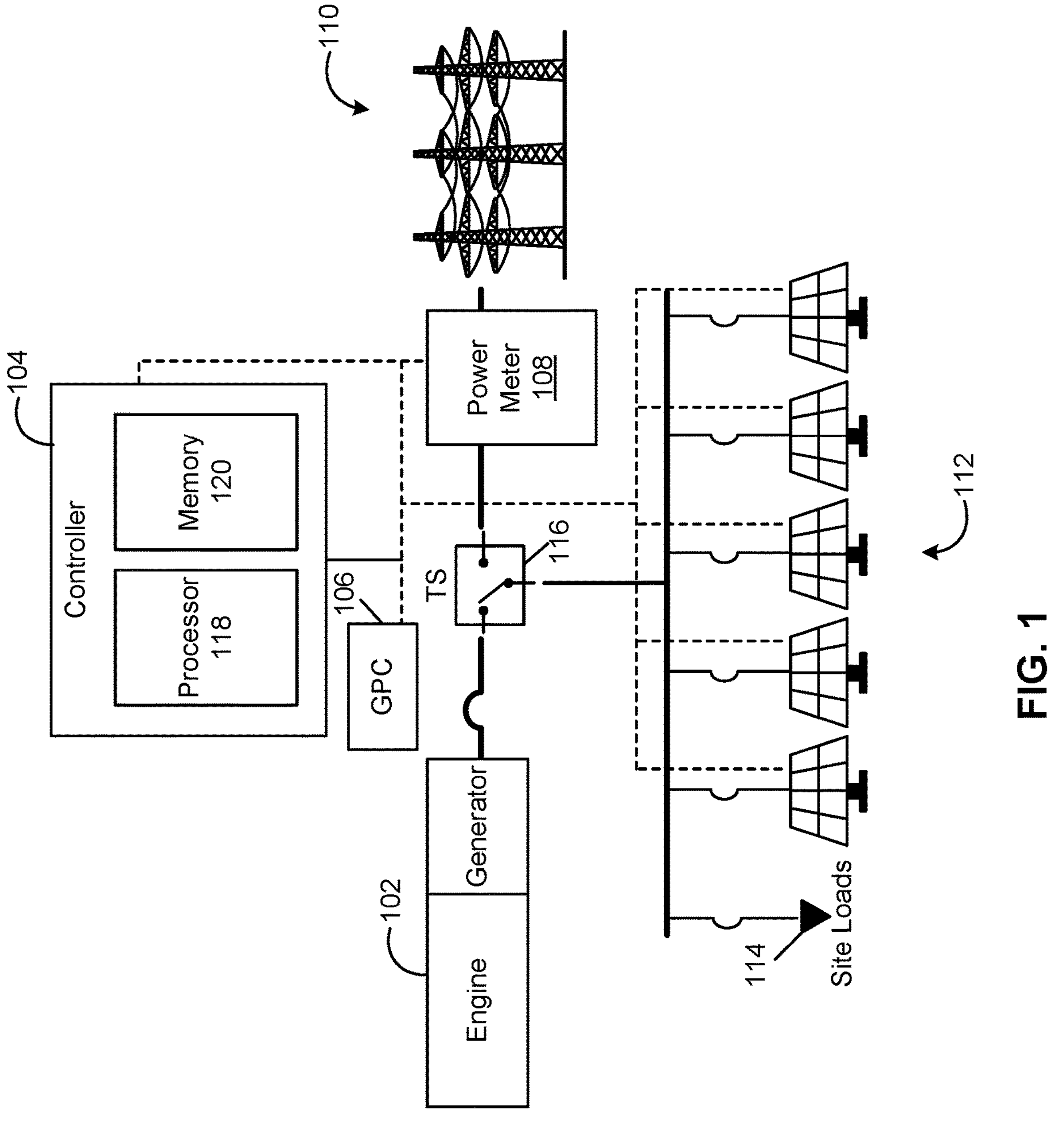
FIG. 1 is a diagram of a first microgrid system, according to an embodiment of the present disclosure.

Referring now to FIG. 1, depicted is a diagram of a first microgrid system 100, according to an example implementation of the present disclosure. The microgrid system 100 may be a type of energy system with one or more distributed energy assets and loads that functions as a single controllable entity. A microgrid may connect and disconnect from the grid such that the microgrid can operate in either a grid-connected or island mode. The microgrid system 100 may include one or more microgrid assets (e.g., energy sources) which are configured to generate and provide power to the microgrid system 100 (e.g., via bolded bus/high power lines, and solid lines shown in FIG. 1 and FIG. 2). The energy sources may generator sets, renewable energy sources (e.g., wind, solar, hydro, geothermal, etc.), energy storage (e.g., batteries, etc.), or fuel cells. For example, the microgrid system 100 may include photovoltaic panels 112, generator sets 102, and a utility grid 110. In some embodiments, the generator set may include an engine and a generator. In some embodiments, the microgrid system 100 may include one or more site loads 114 which are configured to receive power from the microgrid system.

In some embodiments, each of the microgrid assets may be connected to a transfer switch 116. In some embodiments, the transfer switch may be an automated transfer switch. In other embodiments, the transfer switch may be a manual transfer switch. A transfer switch is an electric switch that switches a power supply to load, between two (or more) sources such as between a generator set and a utility source. The transfer switch 116 may be configured to switch the microgrid from being connected to the utility grid 110 or disconnected from the utility grid 110.

In some embodiments, the microgrid system 100 includes a generator set paralleling controller 106 which is configured provide paralleling of multiple generator sets 102 to the utility 110. In some embodiments, the microgrid system 100 includes a power meter 108 configured to monitor the power produced or otherwise supplied by the microgrid assets and used by the site loads 114.

In some embodiments, the microgrid system 100 include a microgrid controller 104 (referred to generally as "controller 104"). The microgrid controller 104 may be configured to manage the distribution of power within the microgrid (e.g., by generating control signals via control/communication/signaling connections, illustrated in dashed lines of FIG. 1 and FIG. 2). In some embodiments, the microgrid controller 104 may monitor the available energy sources and their utilization (e.g., via data/information received via such control/communication/signaling connections), and adjusts the distribution of power in the microgrid accordingly, to optimize the power supplied to or otherwise distributed within the microgrid system 100. In some embodiments, the microgrid controller 104 may manage the connection and interaction between the microgrid assets (e.g., generator sets 102, the photovoltaic panels 112, the site loads 114, etc.) and the utility grid 110. The microgrid controller 104 may be configured to manage the power exchange between the microgrid assets and the utility grid 110. In some embodiments, the microgrid controller 104 may be configured to manage the power exchange between the microgrid assets and utility grid 110 according to one or more selected modes and selected sequence of operations, as described in greater detail below. In some embodiments, the microgrid controller 104 may be configured to receive, via a human machine interface (HMI), a sequence of operations in which to control power supply to the microgrid. The microgrid controller 104 may be further configured to determine an operating mode in which to supply power to the one or more loads, from a plurality of operating modes, according to the sequence of operations. The microgrid controller 104 may be configured to control one or more interfaces according to the operating mode, to control the supply of power to the one or more loads.

The microgrid controller 104 may include one or more processors 118 and memory 120. The processor(s) 118 may be or include any device, component, element, or hardware designed or configured to perform the various steps recited herein. For example, the processor(s) 118 may include any number of general purpose single- or multi-chip processors, digital signal processors (DSP), application specific integrated circuits (ASIC), field programmable gate arrays (FPGA), or other programmable logic device(s), discrete gate or transistor logic, discrete hardware components, or any combination thereof designed or configured to perform the various steps recited herein. In some embodiments, the microgrid controller 104 may include a single processor 118 designed or configured to perform each of the various steps recited herein.

In some embodiments, the microgrid controller may include multiple processors 118 which are designed or configured perform (e.g., either separately or together) each of the various steps recited herein. As one example, the microgrid controller 104 may include a first processor 118 designed or configured to perform a first subset of the various steps, and a second processor 118 designed or configured to perform a second subset of the various steps (with the first subset being different from the second subset). As another example, the microgrid controller 104 may include first and second processors 118 which together perform the various steps in a distributed fashion. As such, unless explicitly indicated otherwise, such as by use of a term such as "a single processor", the term "one or more processor(s)" as used herein contemplates and encompasses embodiments in which all of the one or more processors perform all of the recited steps or features, different processors separately perform different ones of the steps or features, the same or different sets of two or more processors work in combination to perform individual steps or features, or any variation thereof. In other words, unless explicitly indicated otherwise, the use of the term "one or more processors" herein contemplates and encompasses a single processor performing all of the steps or features and two or more processors working individually or in combination, where each step or feature is performed by any one or combination of two or more of the processors. The memory 120 may be or include any type or form of data storage device, including tangible, non-transient volatile memory and/or non-volatile memory.

Figure 2:
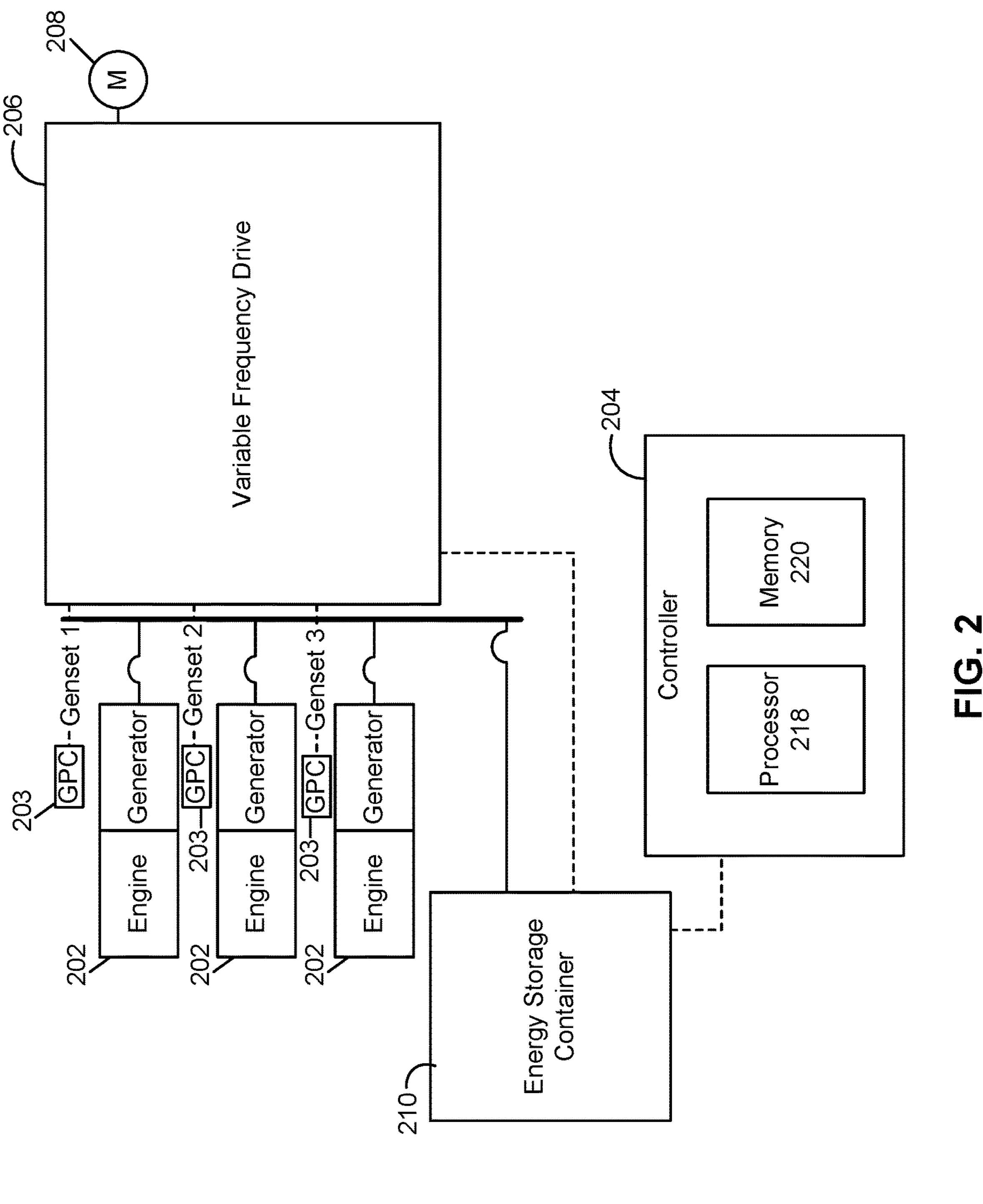
FIG. 2 is a diagram of second microgrid system, according to an embodiment of the present disclosure.

Referring now to FIG. 2, depicted is a diagram of a second microgrid system 200, according to another example implementation of the present disclosure. The microgrid system 200 may be a type of energy system with one or more distributed energy assets and loads that function as a single controllable entity. A microgrid may connect and disconnect from the grid such that the microgrid can operate in either a grid-connected or island mode. The microgrid system 100 may include one or more microgrid assets (e.g., energy sources) which are configured to generate and provide power to the microgrid system 100. The energy sources may generator sets, renewable energy sources (e.g., wind, solar, hydro, geothermal, etc.), energy storage (e.g., batteries, etc.), or fuel cells. For example, the microgrid system 100 may include generator sets 202 and energy storage container 210. In some embodiments, the generator set 202 may include an engine and a generator. In some embodiments, the microgrid system 200 includes a generator set paralleling controller 203 which is configured provide paralleling of multiple generator sets 202 to the utility 110.

In some embodiments, the energy storage container 210 may be an energy storage device which is configured to store energy that the microgrid system 200 can use to supplement the power supplied by the microgrid assets. In some embodiments, the energy storage container may be, but is not limited to, battery energy storage systems, compressed air storage systems, fuel cells, thermal energy storage systems, and mechanical energy storage systems.

The microgrid system 200 includes a variable frequency drive 206. The variable frequency drive 206 may be a type of motor controller the drives a motor 208 by varying the frequency of voltage of its power supply. In some embodiments, the variable frequency drive 206 controls the speed of the motor 208.

In some embodiments, the microgrid system 200 include a microgrid controller 204, which may be similar to the microgrid controller 104 of FIG. 1. In other words, the microgrid controller 204 may be configured to manage the distribution of power within the microgrid. Similar to the microgrid controller 104 of FIG. 1, the microgrid controller 204 may monitor the available energy sources and their utilization and adjusts the distribution of power in the microgrid accordingly to optimize the power produced by the microgrid system 200. In some embodiments, the microgrid controller 204 may manage the connection and interaction between the microgrid assets (e.g., generator sets 202, energy storage container 210, etc.) and the utility grid (not shown).

INDUSTRIAL APPLICABILITY

The disclosed embodiments may be applicable to any microgrid system or solution. The microgrid system may be any type of self-sufficient energy system which serves a specific and discrete geographic area such as construction sites, campuses, hospitals, businesses, residential neighborhoods, etc. The microgrid system, may include one or more energy sources/microgrid assets, a load, and a microgrid controller. The one or more energy sources may include renewable energy sources (e.g., photovoltaic panels, wind turbines, etc.), energy storage sources (e.g., batteries, fuel cells,), and generator sets. The microgrid may also be connected to a utility power grid.

In some embodiments, the microgrid can operate independently. Specifically, microgrids can disconnect from the central grid and operate independently (e.g., islanding). Being able to operate independently allows microgrids to provide power when the central grid or utility is down due to blackouts or brownout. Further, microgrids are able to supplement the power provided by the central grid during periods of high demand.

Figure 3:
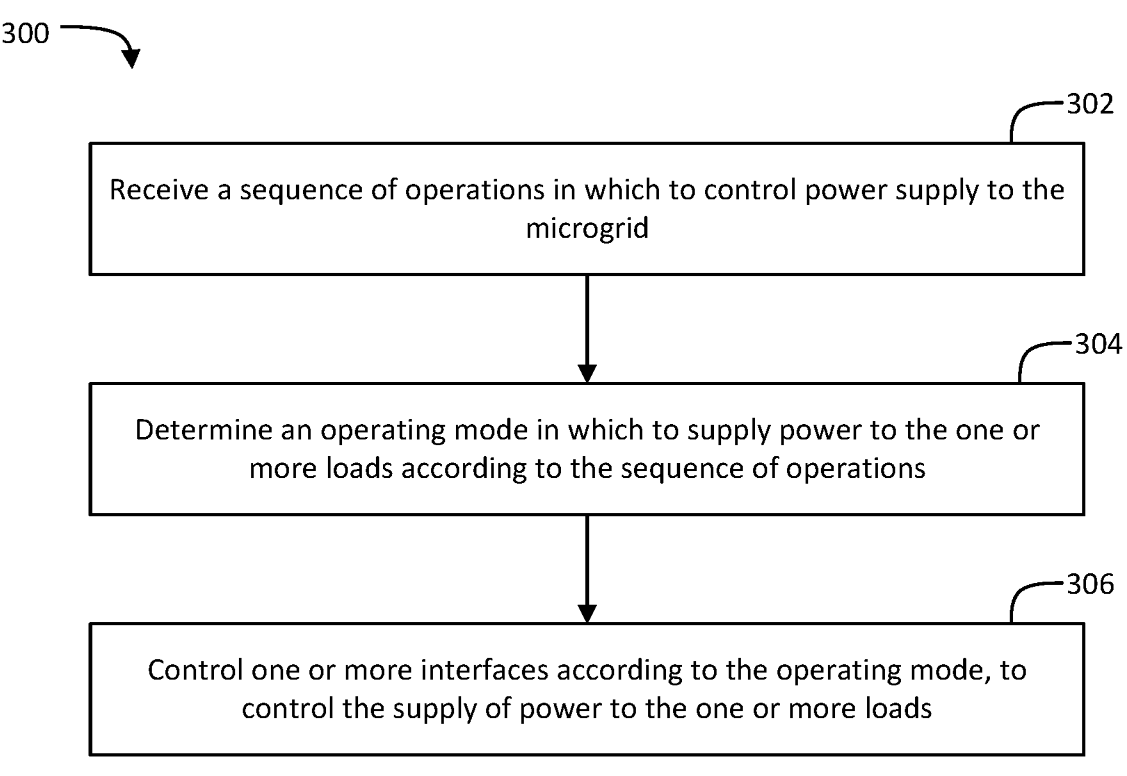
FIG. 3 is a flowchart showing a method of selecting operation modes for a microgrid, according to an embodiment of the present disclosure.

Referring now to FIG. 3, depicted is a flowchart showing an example method 300 of selecting operation modes for a microgrid, according to an example implementation of the present disclosure. The method 300 may be performed by, implemented on, or otherwise executed by the components, elements, or hardware described above with reference to FIG. 1 through FIG. 2. For example, the method 300 may be executed by the microgrid controller 104 of FIG. 1 or the microgrid controller 204 of FIG. 2. As a brief overview, at step 302, the microgrid controller may receive a sequence of operations in which to control power supply to the microgrid. At step 304, the microgrid controller may determine an operating mode in which to supply power to the one or more loads according to the sequence of operations. At step 306, the microgrid controller may control one or more interfaces according to the operating mode, to control the supply of power to the one or more loads.

At step 302, the microgrid controller may receive a sequence of operations in which to control power supply to the microgrid. The sequence of operations may refer to a group of control setpoints which may be used to control the operation of a microgrid such as the microgrids 100 and 200 described above. In some embodiments, the sequence of operations may be received via a human machine interface (HMI) from a user. In some embodiments, the sequence of operations may include one or more optimization mode setpoints, one or more asset group operating mode setpoints, and one or more power dispatch schemes which correspond to a status of a respective microgrid power supply asset. For example, the optimization mode setpoints may include an economy mode which may optimize the operation of the microgrid for economic priorities. The optimization mode setpoints may also include a renewable mode which may optimize the operation of the microgrid to prioritize the use of renewable energy resources. The optimization mode setpoints may include an emissions mode which may optimize the operation of the microgrid to lower emissions. The optimization mode setpoints may include a reliability mode which may optimize the reliability of microgrid. In some embodiments, the sequence of operations may be determined by and based on one or more operating conditions of the microgrid. The operating conditions may include certain times of day, certain seasons, weather conditions, etc. For example, during certain times of day, the power demand for the microgrid may be higher or lower during certain times of the day. For example, during daytime hours, the power demand for a microgrid may be higher. Therefore, during the day, the sequence of operations may prioritize microgrid assets which can handle the higher power demand or ensure that more microgrid assets are enabled so that the power demand can be met. In contrast, during the night, the sequence of operations may prioritize using the utility power grid due to lower operating or power costs.

At step 304, the microgrid controller may determine an operating mode in which to supply power to one or more loads associated with the microgrid according to the sequence of operations. In some embodiments, the operating mode may be selected from multiple operating modes. For example, the multiple operating modes may include a managed point of common coupling mode, an unmanaged point of common coupling mode, a demand limiting mode, an import/export mode, a silent mode, an islanding mode, or a utility failure mode. The operating mode may be determined based on the sequence of operations received at step 302. As described the sequence of operations is determined based on operating conditions for the microgrid (e.g., time of operation, weather conditions, power demand conditions, etc.). The sequence of operations may also be based on the preferences of a microgrid operator. The microgrid controller may use the sequence of operations to determine an operating mode of the microgrid. In some embodiments, the multiple operating modes may be configurable set points which may work with grid connected or islanded microgrid systems.

At step 306, the microgrid controller may control one or more interfaces according to the operating mode, to control the supply of power to the one or more loads. In some embodiments, the one or more interfaces may be configured to connect various parts of the microgrid and control the supply of power from the power sources in the microgrid to the loads connected to the microgrid. In some embodiments, the one or more interfaces may include at least one of a transmission switch, a transfer switch, or a generator set paralleling controller. The microgrid controller may control the operations of either a transmission switch, transfer switch, or generator set paralleling controller to connect or disconnect different assets in the microgrid to control the supply of power to the one or more loads.

Figure 4A:
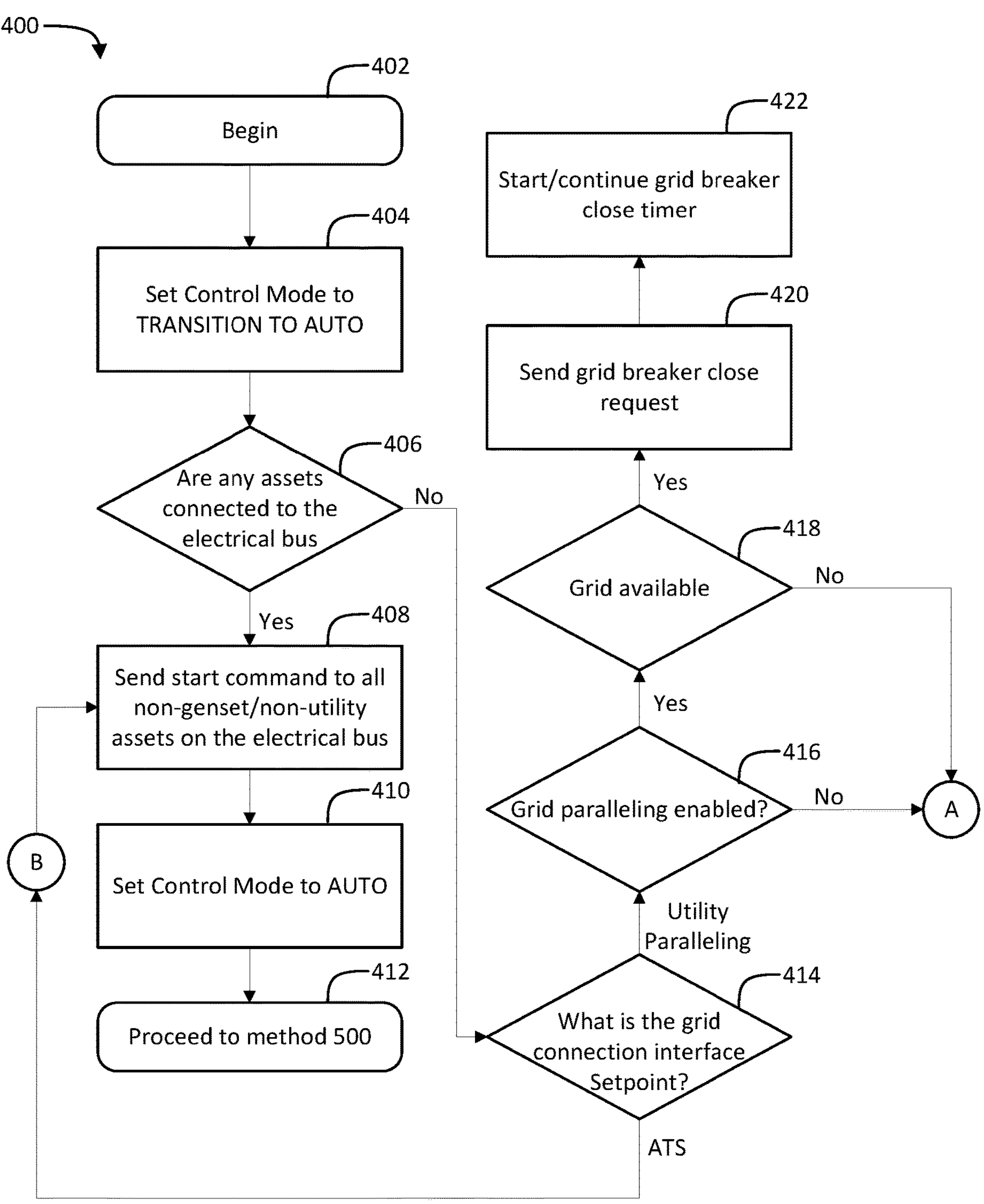
FIGS. 4A-4B is a flowchart showing a method of starting up the process for selecting operation modes for a microgrid, according to an embodiment of the present disclosure.
Figure 4B:
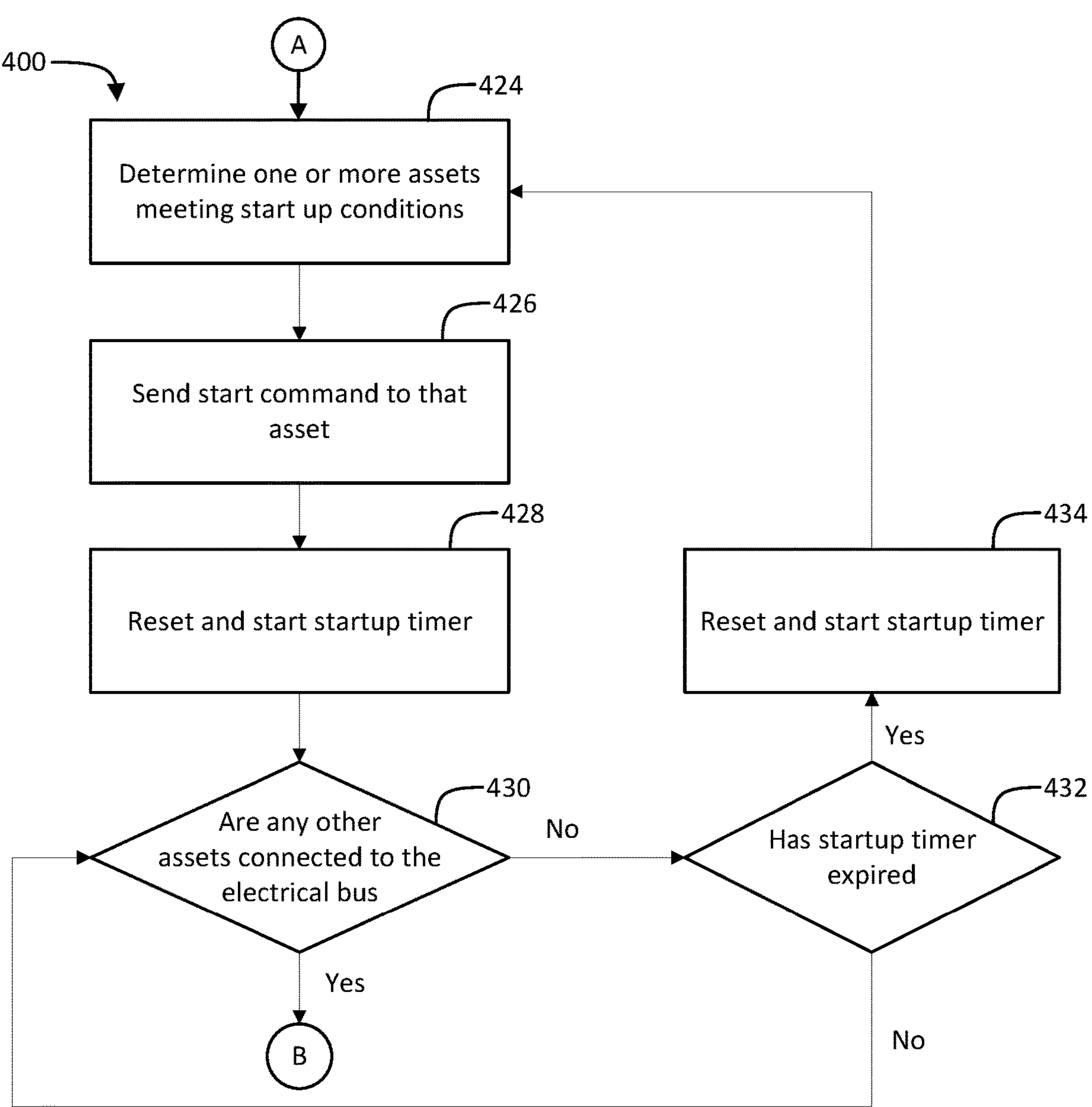

Referring now to FIGS. 4A-4B, depicted is a flowchart showing an example method 400 showing a method of starting up the process for selecting operation modes for a microgrid, according to an example implementation of the present disclosure. The method 400 may be performed by, implemented on, or otherwise executed by the components, elements, or hardware described above with reference to FIG. 1 through FIG. 2. For example, the method 400 may be executed by the microgrid controller 104 of FIG. 1 or the microgrid controller 204 of FIG. 2.

After the method 400 begins at step 402, at step 404, the microgrid controller sets the control mode to "TRANSITION TO AUTO." This may cause the operation of the microgrid controller to transition to an automatic mode. In some embodiments, the microgrid can operate in an automatic mode, a manual mode, a not in control mode, idle mode, and on/off modes. In automatic mode, the microgrid automatically determines what commands to send to the microgrid assets. In the manual mode, a user manually enters the commands which are sent to the microgrid assets. In the start-up method for the microgrid described in FIGS. 4A-4B, the microgrid controller may be set to operate the microgrid in an automatic mode. However, that is just an exemplary embodiment and the microgrid controller may transition to any other mode including manual mode, not in control mode, and on/off modes at step 404. In the idle mode, the microgrid controller may not issue/send/provide command(s) to the microgrid assets, but may monitor/receive/detect data, measurements, or other information related to the microgrid assets. In the off mode, the microgrid controller may not issue/send/provide command(s) to the microgrid assets, and may also not monitor/receive/detect data, measurements, or other information related to the microgrid assets.

At step 406, the microgrid controller may determine if there are any microgrid assets connected to the electrical bus for the microgrid. In some embodiments, the electrical bus may be an alternate current (AC) electrical bus configured to facilitate the connection of the microgrid assets with each other (e.g., photovoltaic panels, wind turbines, generator sets, energy storage containers, loads, utility assets, etc.). In other embodiments, the electrical bus may be a direct current (DC) electrical bus. If there are assets connected to the electrical bus, the method moves to step 408. If there are no assets connected to the electrical bus, the method proceeds to step 414. At step 408, the microgrid controller may send a start command to all non-generator set and/or non-utility assets on the electrical bus. For example, referring to the microgrid 100 shown in FIG. 1, the microgrid controller 104 may send a start command to the photovoltaic panels 112 at step 408. At step 410, the microgrid controller may set the control mode for the microgrid controller to automatic (e.g., "AUTO") completing the transition to automatic mode started at step 404. At step 412, the microgrid controller would proceed to method 500 which is described in more detail below with respect to FIGS. 5A-5C.

As described above, the method proceeds to step 414 if there are no assets connected to the electrical bus. At step 414, the microgrid controller may determine what the grid connection interface setpoint is. The grid connection interface setpoint may describe the connection scheme between the microgrid and the utility assets. In some embodiments, the grid connection interface setpoint may be at least one of ATS, grid paralleling, or utility paralleling. If the grid connection interface setpoint is set to ATS, the method proceeds back to step 408 which is described in more detail above. If the grid connection interface setpoint is set to utility paralleling, the method proceeds to step 416.

At step 416, the microgrid controller determines if grid paralleling is enabled. In a grid paralleling control mode, the microgrid assets (e.g., photovoltaic panels, generator sets, etc.) are connected to a utility grid in parallel and is synchronized with the utility grid. If grid paralleling not enabled (e.g., no) at step 416, the method proceeds to point A on FIG. 4B. If grid paralleling is enabled (e.g., yes), the method proceeds to step 418. At step 418, the microgrid controller determines if the grid is available. If the grid is not available (e.g., no), the method proceeds to point A on FIG. 4B. If the grid is available (e.g., yes), the method proceeds to step 420. If the grid is not available (e.g., no), the method proceeds to point A on FIG. 4B.

At step 420, the microgrid controller sends a grid breaker close request. In some embodiments, a breaker close request is sent to a synchronization check device that closes the breaker when synchronism is determined in the microgrid. The grid breaker close request may be or include a signal sent by the microgrid controller to a circuit breaker which connects the microgrid to the utility grid. The signal may cause the circuit breaker to close, to thereby connect the microgrid to the utility grid. At step 422, the microgrid controller starts or continues the grid breaker close timer. In some embodiments, the grid breaker close timer triggers a "fail to close" diagnostic (i.e., if breaker does not close before this time expires). Once the diagnostic is triggered, the microgrid controller notifies the user through HMI that breaker has failed to close. The grid breaker close timer may be or include a timer which times or computes a duration in which the utility grid is connected to the microgrid. For example, a particular operation mode may include connecting the utility grid to the microgrid for a predetermined or set duration (e.g., a number of hours, a predetermined time window, etc.), to limit an amount of power supplied by the utility grid. The microgrid controller may start or continue the grid breaker close timer, to compare the time in which the utility grid supplies power to the microgrid to the predetermined or set duration.

At step 424, the microgrid controller determines one or more assets meeting start up conditions. In some embodiments, following step 424, the microgrid controller may identify the asset group (e.g., group of photovoltaic panels, group of wind turbines, group of generator sets, group of energy storage containers, etc.) with the highest startup priority. In some embodiments, the highest startup priority may be predetermined and stored in the microgrid controller. For example, each of the assets may have a predetermined priority score or value relative to each other (e.g., the photovoltaic panels may have a higher priority score than the generator sets, etc.). In other embodiments, the highest startup priority may be determined dynamically based on the current operation microgrid. For example, the highest priority may be assigned to whichever asset group has the highest power output, the most sustainable power output, or the most economic power output according to the goals of the microgrid controller.

At step 426, the microgrid controller sends a start command to the assets within the asset group with the highest startup priority. At step 428, the microgrid controller resets and starts a startup timer. At step 430, the microgrid controller determines whether there are any other assets connected to the electrical bus of the microgrid. If there are any other assets connected to the electrical bus (e.g., yes), the method proceeds to point B on FIG. 4A. If there are no other assets (e.g., no), the method proceeds to step. At step 432, the microgrid controller determines if the startup timer has expired. If the timer has expired (e.g., yes), the method proceeds step 434 where the microgrid controller resets and starts the startup timer. If the timer has not expired (e.g., no), the method proceeds to step 430 which is explained above.

Figure 5A:
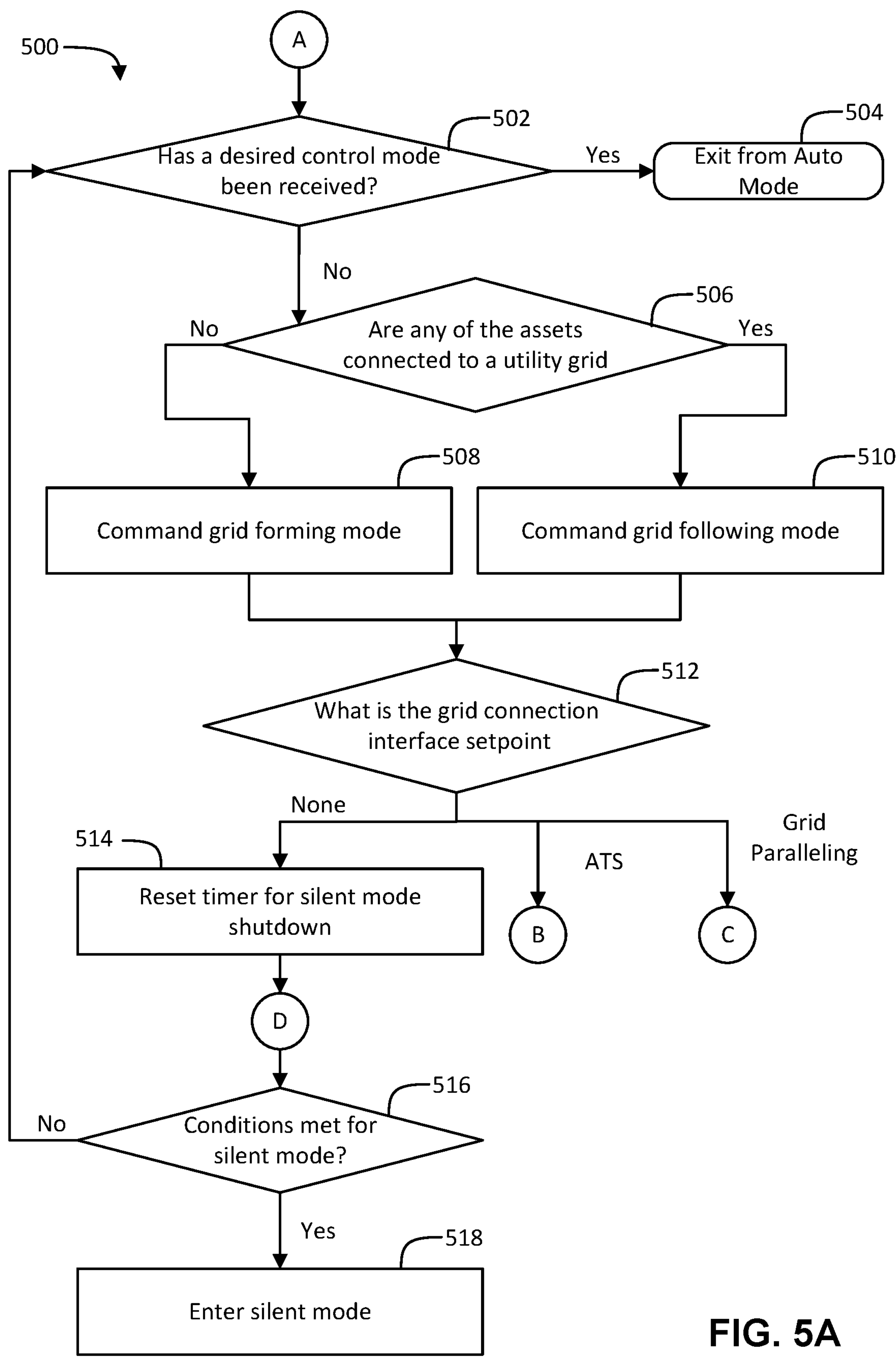
FIGS. 5A-5C is a flowchart showing a method for selecting operation modes for a microgrid in an automated mode, according to an embodiment of the present disclosure.
Figure 5B:
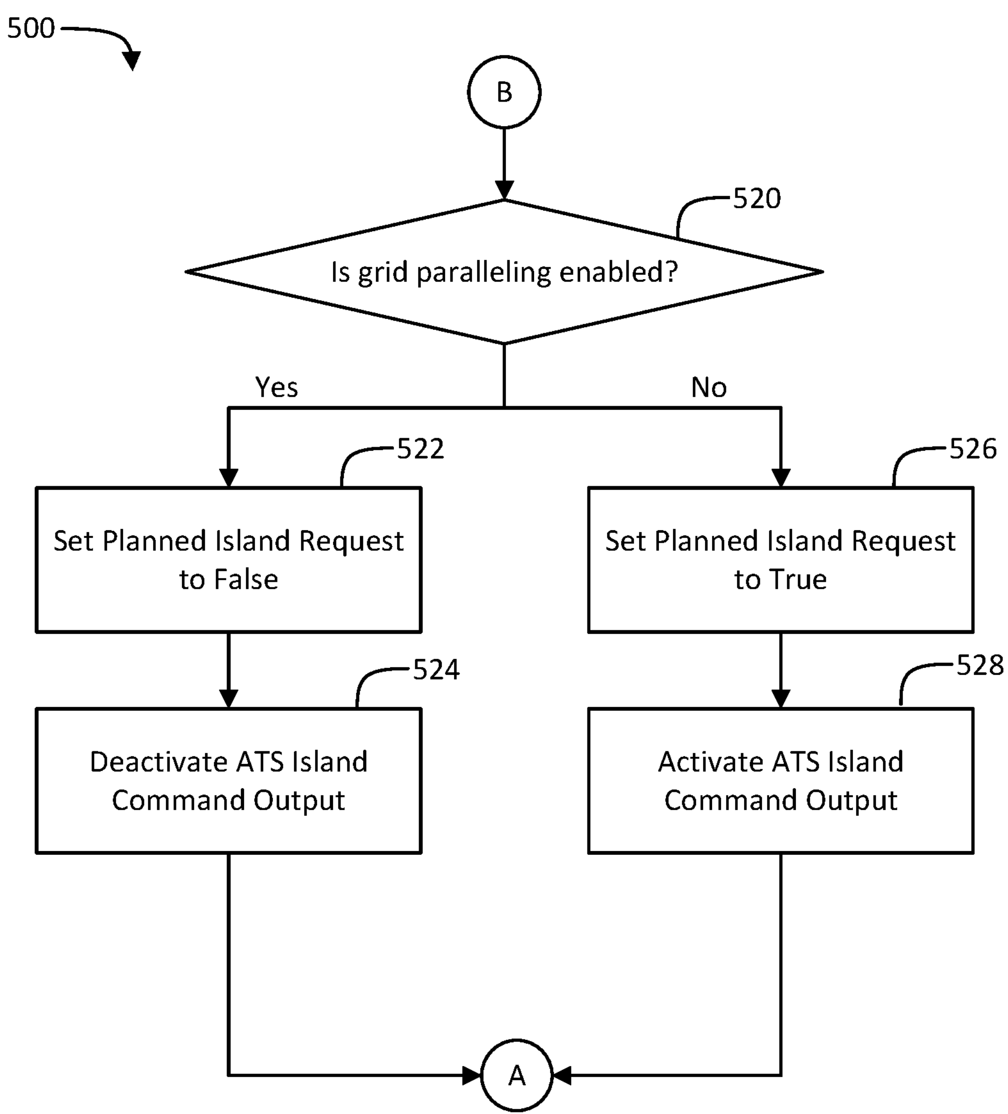
Figure 5C:
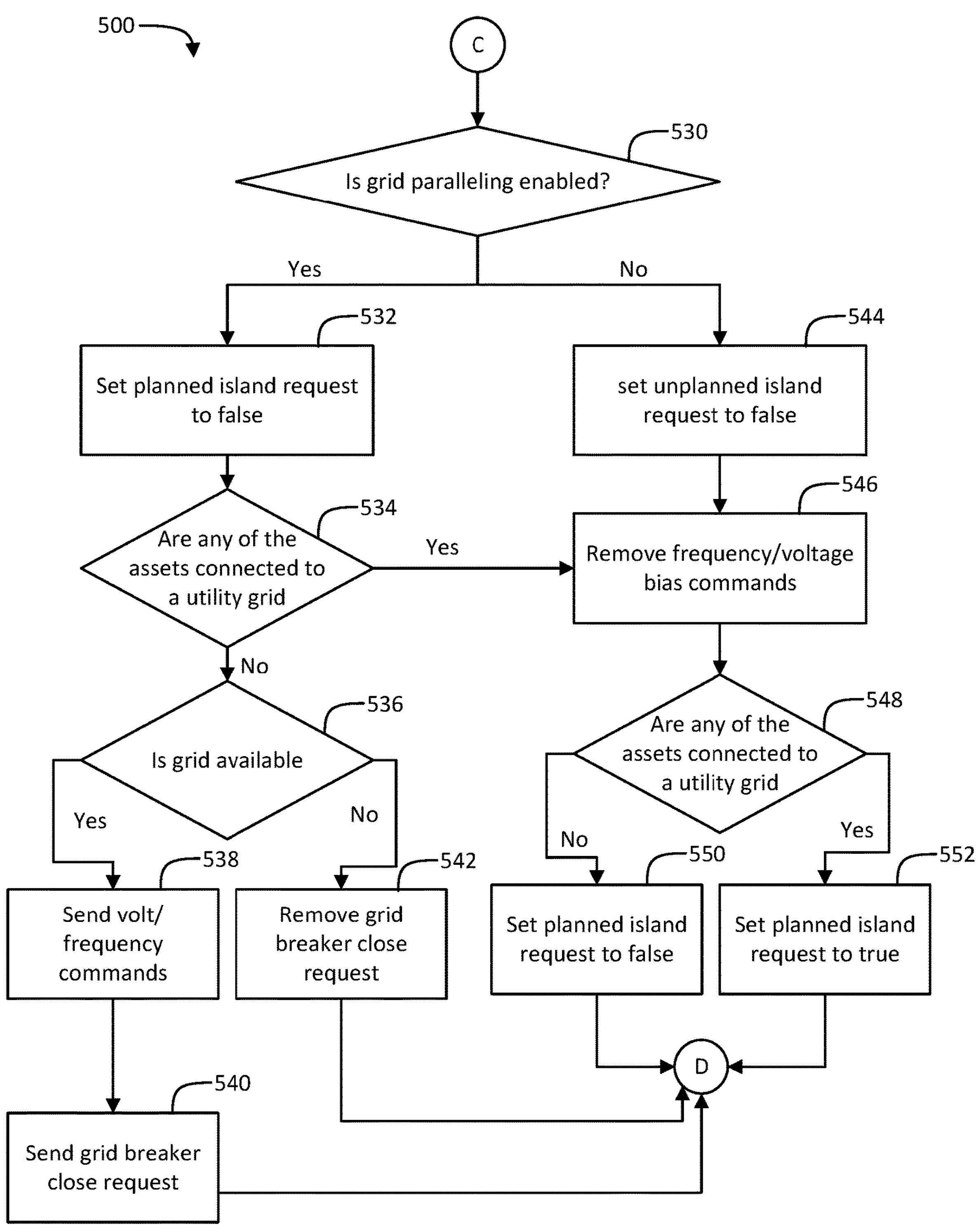

Referring now to FIGS. 5A-5C, depicted is a flowchart showing an example method 500 showing a method for selecting operation modes for a microgrid in an automatic mode, according to an example implementation of the present disclosure. The method 500 may be performed by, implemented on, or otherwise executed by the components, elements, or hardware described above with reference to FIG. 1 through FIG. 2. For example, the method 500 may be executed by the microgrid controller 104 of FIG. 1 or the microgrid controller 204 of FIG. 2.

Referring specifically to FIG. 5A, at step 502, the microgrid controller determines if a desired control mode has been received. In some embodiments, the desired control mode may be at least one of an off mode, an idle mode, and a manual mode. If the desired control mode has been received (e.g., which overrides automatic mode), the microgrid exits from the automatic mode and begins operating in the desired control mode at step 504. If the desired control mode has not been received, the microgrid controller proceeds to step 506. At step 506, the determines if there are any microgrid assets (e.g., photovoltaic panels, wind turbines, generator sets, energy storage containers, etc.) connected to a utility grid. If there are not any assets connected to the utility grid, the method proceeds to step 508. At step 508, the microgrid controller may command the grid to operate in a grid forming mode. In a grid forming mode, inverter-based energy sources (e.g., photovoltaic panels, wind turbines, batteries, etc.) in the microgrid provide voltage and frequency support to a utility grid during time periods when utility grid is experiencing a disturbance or outage. In a grid forming mode, the inverter-based energy sources can adjust their output power and voltage in response to operating conditions for the microgrid and coordinate with other energy sources in the microgrid to balance power supply and demand. If there are any assets connected to the utility grid, the method proceeds to step 510. At step 510, the microgrid controller may command the grid to operate in a grid following mode. In a grid following mode, the inverter-based energy sources synchronize its output with the utility grid voltage and frequency. In the grid following mode, the inverter-based energy sources depend on the utility grid to provide a stable voltage and frequency which they can follow. In a grid following mode, the microgrid may not operate in an islanded mode.

At step 512, the microgrid controller may determine the grid connection interface setpoint. The grid connection interface setpoint may describe the connection scheme between the microgrid and the utility assets. In some embodiments, the grid connection interface setpoint may be at least one of automatic transfer switching (ATS), grid paralleling, or utility paralleling. If the grid connection interface setpoint is ATS, the method proceeds to point B on FIG. 5B which is described in more detail below. If the grid connection interface setpoint is grid paralleling, the method proceeds to point C on FIG. 5C which is described in more detail below.

If there is no grid connection interface setpoint at step 512, the method proceeds to step 514. At step 514, the microgrid controller resets the timer for silent mode shutdown. At step 516, the microgrid controller determines if one or more conditions are met for the microgrid to operate in silent mode. In some embodiments, a condition for operating in silent mode may be time of day of operation. For example, during the night, silent mode may be enabled, as it may be desirable to operate quiet assets during the night or outside business hours to avoid causing a disturbance. In some embodiments, a condition for operating in silent mode may be that energy storage has enough reserve power to cover the required reserve. In some embodiments, a condition for operating in silent mode may be that the energy storage has enough energy to sustain the load for a user specified amount of time. In some embodiments, a condition for operating in silent mode may be that the Energy storage has the kVAr and kVA capacity to carry the load. In some embodiments, a condition for operating in silent mode is that the generator sets have been running for at least a certain period of time. In silent mode, the microgrid may operate using power supply from microgrid assets which are quieter than other microgrid assets. For example, in silent mode, the microgrid may operate using power supply from photovoltaic panels as opposed to generators, because photovoltaic panels produce less noise than generators. If the conditions are met for silent mode (e.g., each of the conditions, a subset of the conditions, or one or more of the conditions are met), the method proceeds to step 518 where the microgrid controller commands the microgrid to enter silent mode. If the conditions are not met for silent mode, the method proceeds back to step 502.

Referring to FIG. 5B, at step 520, the microgrid controller determines if grid paralleling is enabled when the grid connection interface setpoint is ATS. In a grid paralleling control mode, the microgrid assets (e.g., photovoltaic panels, generator sets, etc.) are connected to a utility grid in parallel with and synchronized with the utility grid. For example, the microgrid controller may sense the output voltage and/or current from the utility grid and control one or more interfaces (e.g., transfer switch, etc.) of the microgrid to mirror and synchronize with the microgrid. If grid paralleling is enabled (e.g., yes), the method proceeds to steps 522 and 524. At step 522, the microgrid controller sets the planned island request to false. At step 524, the microgrid controller deactivates automatic transfer switching island command output. If grid paralleling is not enabled (e.g., no), the method proceeds to steps 526 and 528. At step 526, the microgrid controller sets the planned island request to true. At step 528, the microgrid controller activates automatic transfer switching island command output. The method would then proceed back to point A on FIG. 5A.

Referring to FIG. 5C, at step 530, the microgrid controller determines if grid paralleling is enabled when the grid connection interface setpoint is grid paralleling. If grid paralleling is enabled (e.g., yes), the method proceeds to steps 532. At step 532, the microgrid controller sets the planned island request to false.

At step 534, the microgrid controller determines if any of the assets are connected to a utility grid. If none of the assets are connected to the utility grid, the method proceeds to step 536. If one or more assets are connected to the utility grid, the method proceeds to step 546. At step 536, the microgrid controller determines if the grid is available. If the grid is not available, the method proceeds to step 542 where the microgrid controller removes the grid breaker close request. The grid breaker close request may be or include a signal sent by the microgrid controller to a circuit breaker which connects the microgrid to the utility grid. The signal may cause the circuit breaker to close, to thereby connect the microgrid to the utility grid. If the grid is available, the method proceeds to step 538 where the microgrid controller sends voltage and/or frequency commands. At step 540, the microgrid controller sends a grid breaker close request.

If grid paralleling is not enabled (e.g., no) at step 530, the method proceeds to step 544. At step 544, the microgrid controller sets the unplanned island request to false. At step 546, the microgrid controller removes frequency and/or voltage bias commands. At step 548, the microgrid controller determines if any of the assets are connected to a utility grid. If none of the assets are connected to the utility grid, the method proceeds to step 550 where the microgrid controller sets planned island request to false. If any of the assets are connected to the utility grid, the method proceeds to step 552 where the microgrid controller sets planned island request to true. The method then proceeds to point D on FIG. 5A.

Figure 6:
FIG. 6 is a flowchart showing a method for selecting operation modes for a microgrid in a manual mode, according to an embodiment of the present disclosure.
Figure 6:
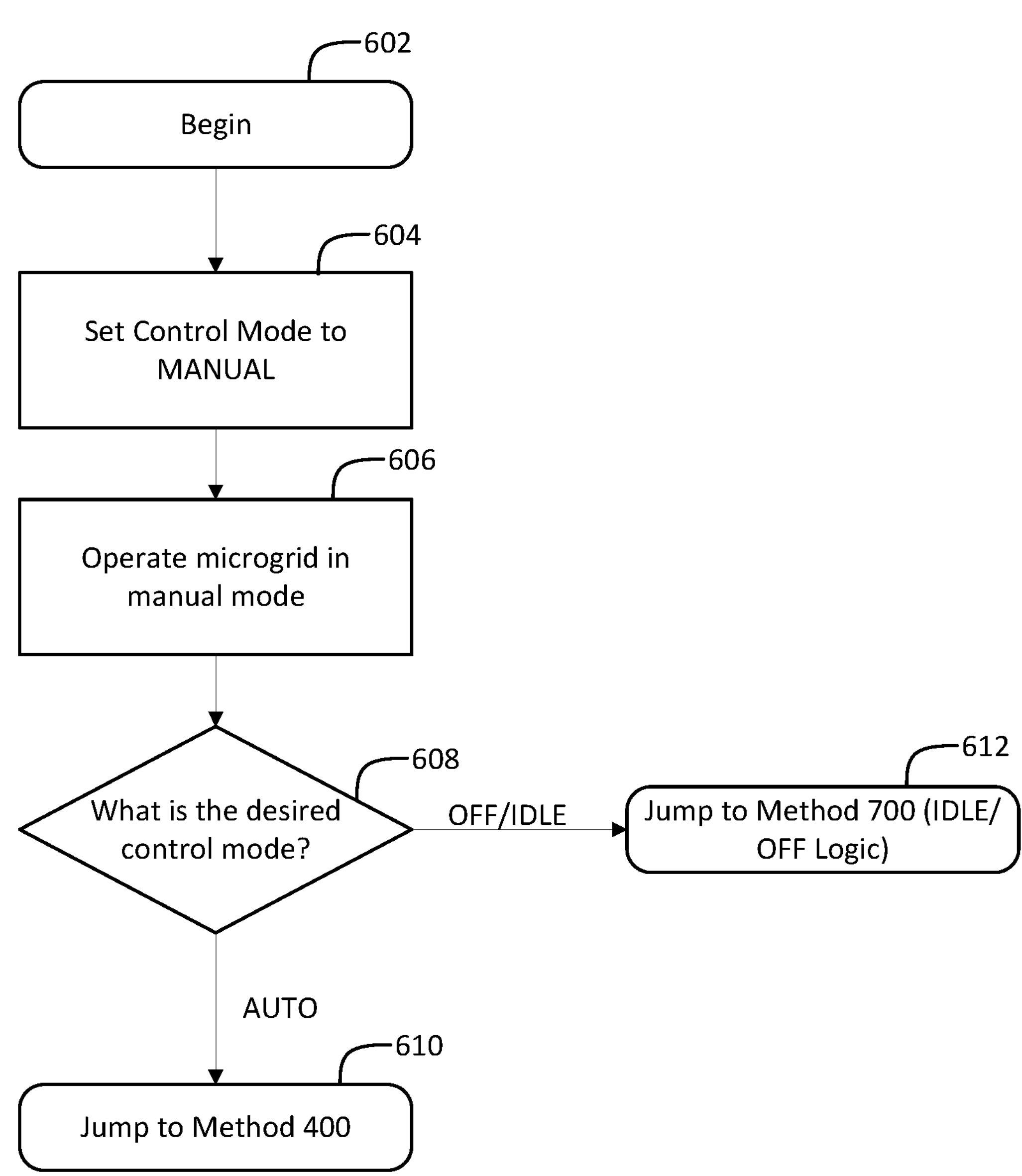

Referring now to FIG. 6, depicted is a flowchart showing an example method 600 for selecting operation modes for a microgrid in a manual mode, according to an example implementation of the present disclosure. The method 600 may be performed by, implemented on, or otherwise executed by the components, elements, or hardware described above with reference to FIG. 1 through FIG. 2. For example, the method 600 may be executed by the microgrid controller 104 of FIG. 1 or the microgrid controller 204 of FIG. 2.

At step 602, the method begins. At step 604, the microgrid controller sets the control mode for a microgrid to manual. At step 606, the microgrid controller operates the microgrid in manual mode. At step 608, the microgrid controller determines if a desired control mode has been received and what the desired control mode is. In some embodiments, the desired control mode may be at least one of an off mode, an idle mode, and an automatic mode. If the desired control mode is off/idle, the microgrid exits from the manual control mode and begins operating in the idle/off mode at step 612. The off/idle mode is described in more detail below with respect to FIG. 7. If the desired control mode is automatic, the microgrid exits from the manual control mode and begins operating in the automatic mode using the startup process at step 610. The startup process is described in more detail above with respect to FIG. 4.

Figure 7:
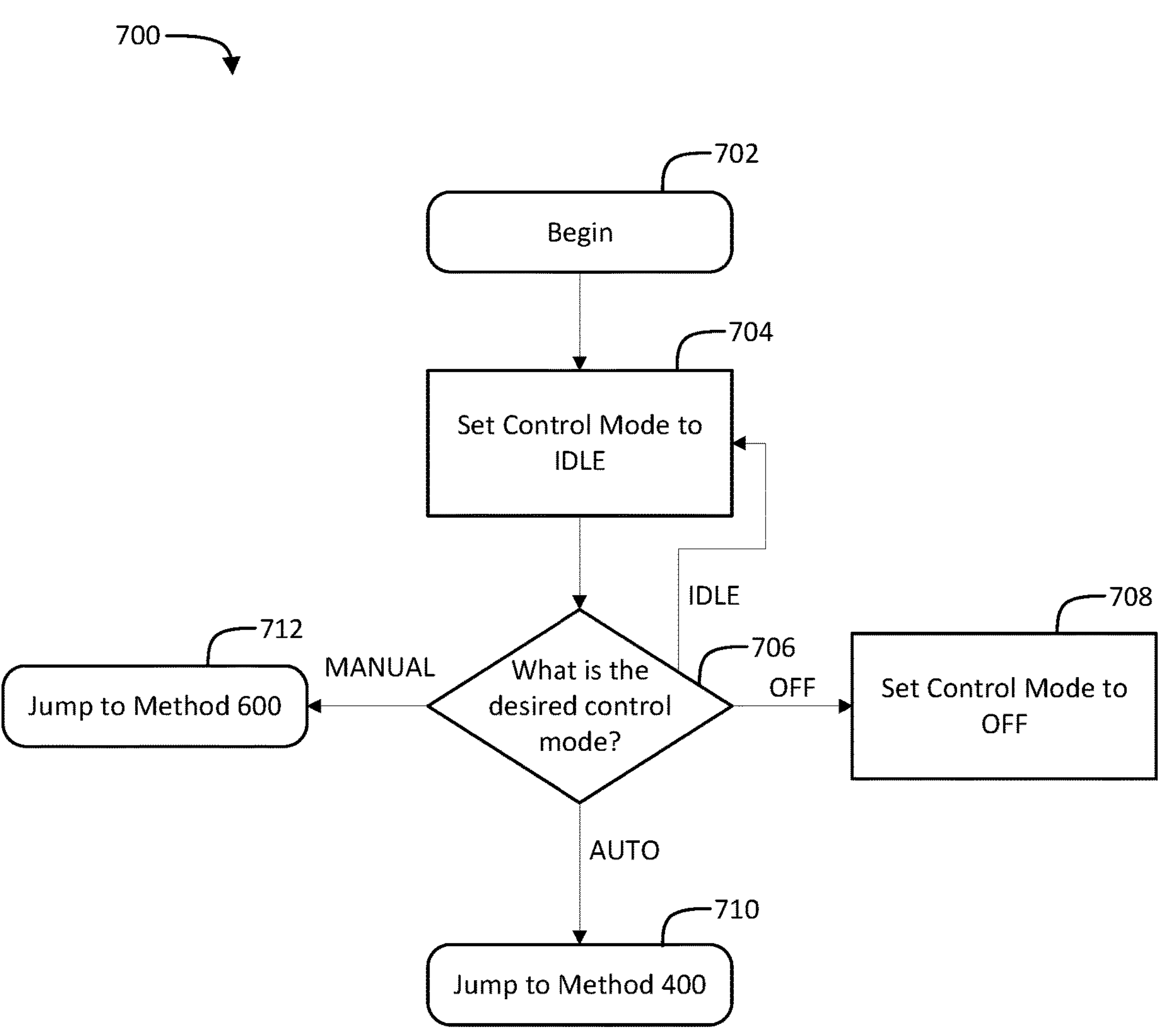
FIG. 7 is a flowchart showing a method for selecting operation modes for a microgrid in an idle mode, according to an embodiment of the present disclosure.

Referring now to FIG. 7, depicted is a flowchart showing an example method 700 showing a method for selecting operation modes for a microgrid in an off/idle mode, according to an example implementation of the present disclosure. The method 700 may be performed by, implemented on, or otherwise executed by the components, elements, or hardware described above with reference to FIG. 1 through FIG. 2. For example, the method 700 may be executed by the microgrid controller 104 of FIG. 1 or the microgrid controller 204 of FIG. 2. At step 702, the method begins. At step 704, the microgrid controller sets the control mode for a microgrid to idle. At step 706, the microgrid controller determines if a desired control mode has been received and what the desired control mode is. In some embodiments, the desired control mode may be at least one of an off mode, an idle mode, a manual mode, and an automatic mode. If the desired control mode is off, the microgrid exits from the idle control mode and begins operating in the microgrid in an off mode at step 708. If the desired control mode is automatic, the microgrid exits from the idle control mode and begins operating in the automatic mode using the startup process at step 710. The startup process is described in more detail above with respect to FIG. 4. If the desired control mode is manual, the microgrid exits from the idle control mode and begins operating in the microgrid in manual mode at step 712. If the desired control mode is idle, the microgrid continues operating in an idle mode.

The microgrid may be operating according to the one or more operating modes. For example, the one or more operating modes may include a managed point of common coupling mode, an unmanaged point of common coupling mode, a demand limiting mode, an import/export mode, a silent mode, an islanding mode, or a utility failure mode. may be set for a microgrid based on a sequence of operations received from a user. The operating mode for the microgrid may be determined based on the sequence of operations received from the user. The sequence of operations may be determined by and based on one or more operating conditions of the microgrid. The operating conditions may include certain times of day, certain seasons, weather conditions, etc. For example, during certain times of day, the power demand for the microgrid may be higher or lower during certain times of the day. As another example, the power demand for the microgrid and the ability to provide power by certain microgrid assets may fluctuate based on the season of operation for the microgrid. For example, during the summer seasons where power demand is high, the sequence of operations received from a user may specify that the priorities of the microgrid include: 1) meeting the high power demand, 2) using microgrid assets that can provide a high amount of power during the summer (e.g., photovoltaic panels, generator sets, etc.). In contrast, during the winder seasons, power demand may be lower and the sequence of operation received from the user may prioritize using microgrid assets which can provide a certain amount of power in winter weather conditions (e.g., wind turbines, utility, generator sets, etc.).

What is claimed is:

1. A system, comprising:

a plurality of microgrid power supply assets of a microgrid, the plurality of microgrid power supply assets including a first microgrid power supply asset of a first type and a second microgrid power supply asset different from the first type; and a microgrid controller communicably coupled to the plurality of microgrid power supply assets, and configured to control supply of power from one or more of the plurality of microgrid power supply assets to one or more loads of the microgrid, the microgrid controller including one or more processors and memory storing instructions that, when executed, cause the microgrid controller to:

receive, via a human machine interface (HMI), a sequence of operations in which to control power supply to the microgrid, the sequence of operations being user-defined and including one or more optimization mode setpoints and one or more asset group operating mode setpoints, the one or more optimization mode setpoints configured to optimize operation of the microgrid to prioritize use of one or more of the plurality of microgrid supply assets according to the one or more optimization mode setpoints;

determine an operating mode in which to supply power to the one or more loads, from a plurality of operating modes, according to the sequence of operations; and control one or more interfaces according to the sequence of operations and the operating mode, to control a supply of power to the one or more loads.

2. The system of claim 1, wherein the plurality of microgrid power supply assets comprise at least one of a generator set, a photovoltaic (PV) panel, or a utility connector configured to connect the microgrid to a utility grid.

3. The system of claim 1, wherein the one or more interfaces comprise at least one of a transmission switch, transfer switch, or a generator set paralleling controller.

4. The system of claim 1, further comprising one or more sensors configured to monitor one or more conditions of respective microgrid power supply assets of the plurality of microgrid power supply assets.

5. The system of claim 4, wherein the one or more sensors comprise a breaker monitor sensor configured to sense an operating condition of a utility connector connecting the microgrid to a utility grid, and wherein one of the plurality of microgrid power supply assets comprises the utility connector.

6. The system of claim 1, wherein the sequence of operations comprise a first sequence according to a first time period, and a second sequence according to a second time period, and wherein the microgrid controller is further configured to:

determine the sequence of operations from the first sequence and the second sequence, according to a current time instance relative to the first time period or the second time period.

7. The system of claim 6, wherein the microgrid controller is configured to determine the sequence of operations according to the current time instance, and determine the operating mode according to one or more conditions of the microgrid.

8. The system of claim 1, wherein at least one of the plurality of microgrid power supply assets is a utility connector configured to connect the microgrid to a utility grid, and wherein the plurality of operating modes comprise at least one of:

a managed point of common coupling mode;
an unmanaged point of common coupling mode;
a demand limiting mode;
an import/export mode;
a silent mode;
an islanding mode; or
a utility failure mode.

9. The system of claim 1, wherein the sequence of operations further includes one or more power dispatch schemes corresponding to a status of a respective microgrid power supply asset, wherein the one or more optimization mode setpoints further comprises at least one of:

a renewable mode setpoint configured to optimize the operation of the microgrid to prioritize the use of one or more renewable energy resources, an economy mode setpoint configured to optimize the operation of the microgrid to prioritize the use of the microgrid for economic priorities, an emissions mode setpoint configured to optimize the operation of the microgrid to prioritize lower emissions, or a reliability mode setpoint configured to optimize the operation of the microgrid to prioritize a reliability of the microgrid.

10. A method comprising:

receiving, by a microgrid controller via a human machine interface (HMI), a sequence of operations in which to control power supply to a microgrid by a plurality of microgrid power supply assets of the microgrid, the plurality of microgrid power supply assets including a first microgrid power supply asset of a first type and a second microgrid power supply asset different from the first type, the sequence of operations being user-defined and including one or more optimization mode setpoints and one or more asset group operating mode setpoints, the one or more optimization mode setpoints configured to optimize operation of the microgrid to prioritize use of one or more of the plurality of microgrid power supply assets according to the one or more optimization mode setpoints;

determining, by the microgrid controller, an operating mode in which to supply power to one or more loads of the microgrid, from a plurality of operating modes, according to the sequence of operations; and controlling, by the microgrid controller, one or more interfaces according to the sequence of operations and the operating mode, to control a supply of power to the one or more loads.

11. The method of claim 10, wherein the plurality of microgrid power supply assets comprise at least one of a generator set, a photovoltaic (PV) panel, or a utility connector configured to connect the microgrid to a utility grid.

12. The method of claim 10, wherein the one or more interfaces comprise at least one of a transmission switch, transfer switch, or a generator set paralleling controller.

13. The method of claim 10, further comprising monitoring, by the microgrid controller, via data from one or more sensors, one or more conditions of respective microgrid power supply assets of the plurality of microgrid power supply assets.

14. The method of claim 13, wherein the one or more sensors comprise a breaker monitor sensor configured to sense an operating condition of a utility connector connecting the microgrid to a utility grid, and wherein one of the plurality of microgrid power supply assets comprises the utility connector.

15. The method of claim 10, wherein the sequence of operations comprise a first sequence according to a first time period, and a second sequence according to a second time period, the method further comprising:

determining, by the microgrid controller, the sequence of operations from the first sequence and the second sequence, according to a current time instance relative to the first time period or the second time period.

16. The method of claim 15, further comprising:

determining, by the microgrid controller, the operating mode according to one or more conditions of the microgrid.

17. The method of claim 10, wherein at least one of the plurality of microgrid power supply assets is a utility connector configured to connect the microgrid to a utility grid, and wherein the plurality of operating modes comprise at least one of:

a managed point of common coupling mode;
an unmanaged point of common coupling mode;
a demand limiting mode;
an import/export mode;
a silent mode;
an islanding mode; or
a utility failure mode.

18. The method of claim 10, wherein the sequence of operations further includes one or more power dispatch schemes corresponding to a status of a respective microgrid power supply asset, wherein the one or more optimization mode setpoints further comprises at least one of:

a renewable mode setpoint configured to optimize the operation of the microgrid to prioritize the use of one or more renewable energy resources, an economy mode setpoint configured to optimize the operation of the microgrid to prioritize the use of the microgrid for economic priorities, an emissions mode setpoint configured to optimize the operation of the microgrid to prioritize lower emissions, or a reliability mode setpoint configured to optimize the operation of the microgrid to prioritize a reliability of the microgrid.

19. The method of claim 10, wherein the operating mode is a first operating mode, the method further comprising:

determining, by the microgrid controller, a condition of the microgrid and/or one or more of the plurality of microgrid power supply assets; and switching, by the microgrid controller, from the first operating mode to a second operating mode, according to the condition, to change a power supplied to the one or more loads from the first microgrid power supply asset to the second microgrid power supply asset.

20. A microgrid controller, comprising:

a communications interface communicably coupled to a plurality of microgrid power supply assets, the plurality of microgrid power supply assets including a first microgrid power supply asset of a first type and a second microgrid power supply asset different from the first type;

a human-machine interface configured to receive a sequence of operations in which to control power supply to a microgrid, the sequence of operations being user-defined and including one or more optimization mode setpoints and one or more asset group operating mode setpoints, the one or more optimization mode setpoints configured to optimize operation of the microgrid to prioritize use of one or more of the plurality of microgrid power supply assets according to the one or more optimization mode setpoints; and a processing circuit including one or more processors and memory storing instructions that, when executed, cause the processing circuit to:

determine an operating mode in which to supply power to one or more loads of the microgrid, from a plurality of operating modes, according to the sequence of operations; and control one or more interfaces according to the sequence of operations and the operating mode, to control a supply of power to the one or more loads.

* * * * *